United States Patent
Pittman

[15] 3,695,301
[45] Oct. 3, 1972

[54] APPARATUS AND METHOD FOR PIPELINE TESTING

[72] Inventor: Forrest C. Pittman, Duncan, Okla.

[73] Assignee: Halliburton Company, Duncan, Okla.

[22] Filed: June 7, 1971

[21] Appl. No.: 150,313

[52] U.S. Cl. ..................................138/97, 62/293
[51] Int. Cl. ...............................................F16l 55/10
[58] Field of Search..................138/97–99; 62/66, 62/293, 259, 62

[56] References Cited

UNITED STATES PATENTS 3,041,850   7/1962   Nunn..........................62/293

3,561,490   2/1971   Little.....................138/97 X

Primary Examiner—William E. Wayner
Attorney—John H. Tregoning, Allan B. Osborne and Max J. Kenemore

[57] ABSTRACT

The invention relates to an apparatus and method of freezing a section of fluid-filled pipeline. The apparatus disclosed herein consists of a cylindrical body which is pumped down the pipeline to the section to be frozen. The body so positioned reduces the volume of fluid required to be frozen while shaped discs attached to each end of the body prevents fluid circulation. Also disclosed is a tank positioned around the exterior of the pipe line which contains refrigerants to freeze the fluid within the pipeline.

11 Claims, 2 Drawing Figures

INVENTOR.
Forrest C. Pittman
BY
Allan B. Osborne
ATTORNEY

APPARATUS AND METHOD FOR PIPELINE TESTING

BACKGROUND OF THE INVENTION

In testing pipelines for leaks a section of line is filled with water and both ends are sealed. The line is then pressured up and allowed to stand for some length of time. During this time, pressure readings are taken. A loss of pressure indicates a leak is in the section. In order to determine the leak's location, the section of line is divided in half and one half tested in the manner described above. By continuing the halving process the location of the leak is pinpointed.

The halving process involves plugging the line in some manner. For example, a method currently in use requires the removal of earth above the line, cutting open the pipe and installing a plate across the passageway. Another method which has been in use for a number of years is to create a dam by freezing the water or other fluids over a short interval in the pipe. This is accomplished by removing the earth from around the pipe, building a housing around the pipe and filling it with a refrigerant such as a mixture of dry ice and gasoline. Whereas this method has many advantages over the above described method, considerable time is required to create the frozen dam. This is because during the freezing operation the whole cross section of the pipe must be frozen and circulation of the water occurs due to the difference in densities induced by the freezing. The circulation takes place over a sizeable length of pipe on each side of the site to be frozen and thus more cooling is required than needed in the absence of circulation. Also, the freezing occurs in layers and since the first layer is adjacent the walls of the pipe, a zone of insulation is established. Thus both the amount of refrigerant required and the length of time to freeze the line increases.

The present invention provides an apparatus for use in freezing the fluid within a short section of a fluid-filled pipeline, which comprises an elongated cylindrical body adapted to be positioned within said pipeline at said short section, said body having an annular, resilient disc at each end thereof, said discs contacting said pipe-line forming a fluid-filled chamber between said pipeline and said body, and refrigerating means positioned at said short section around the exterior of said pipeline, said means operative to freeze the fluid in said fluid-filled chamber.

BRIEF DESCRIPTION OF THE DRAWING

The present invention will be more particularly understood by reference to the accompanying drawings wherein.

DETAILED DESCRIPTION OF THE PREFERRED EMBODIMENT

Figure 1:
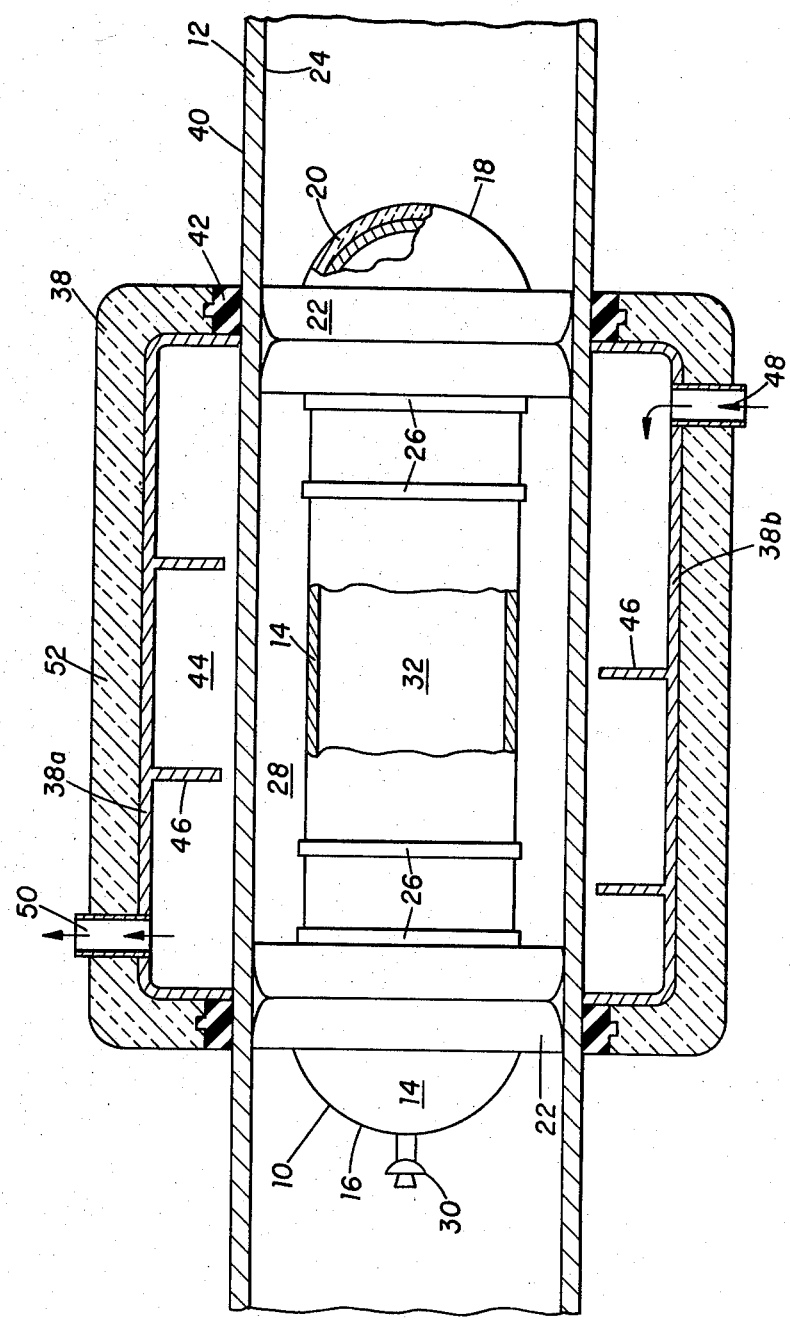
FIG. 1 is a cross-sectional side view of the preferred embodiment of this invention.

Referring to FIG. 1 of the drawing, a cylindrical body 10, constructed in accordance to a preferred embodiment of the present invention is shown positioned in a length of pipeline 12. Body 10 consists of a cylindrical shell 14 made of high strength material, such as steel, capable of withstanding high collapse pressures. Shell 14 has rounded ends 16 (on the left) and 18 (on the right). These ends 16 and 18 are covered by insulation 20, composed of material such as layers of aluminum foil separated by layers of glass-fiber paper. Attached to shell 14 and positioned adjacent each end 16 and 18 are resilient cup-shaped discs 22 which extend radially to contact interior wall 24 of pipeline 12. Encircling shell 14 are a plurality of ribs 26 which project radially into the annular space 28 between shell 14 and interior wall 24. Ribs 26 are made of rigid material such as key stock steel and are welded or otherwise fastened securely to shell 14.

A conventional radio transmitter 30 is attached to end 16 of shell 14. Since this particular mechanism is well known in the art, no specific form has been illustrated other than a symbol.

The interior 32 of shell 14 may be a vacuum or may be filled with an insulating material such as plastic foam.

Surrounding a portion of pipeline 12 is tank 38 which is composed of two sections 38a and 38b made of steel, plastic or fiber glass. The two sections, after being placed around pipeline 12, are bolted together (not shown) to form, in cooperation with exterior wall 40 and gasket 42 therein between, an interior chamber 44. A plurality of baffles 46 attached to tank 38 project into chamber 44 a short distance, causing coolants (not shown) entering the chamber 44 via inlet 48 to circulate completely around the pipeline 12 before passing out through outlet 50. A layer of insulation 52 is affixed to tank 38. As with insulating layer 20 on body 10, insulation 52 may be layers of aluminum foil separated by layers of glass-fiber paper or other suitable insulating material.

Figure 2:
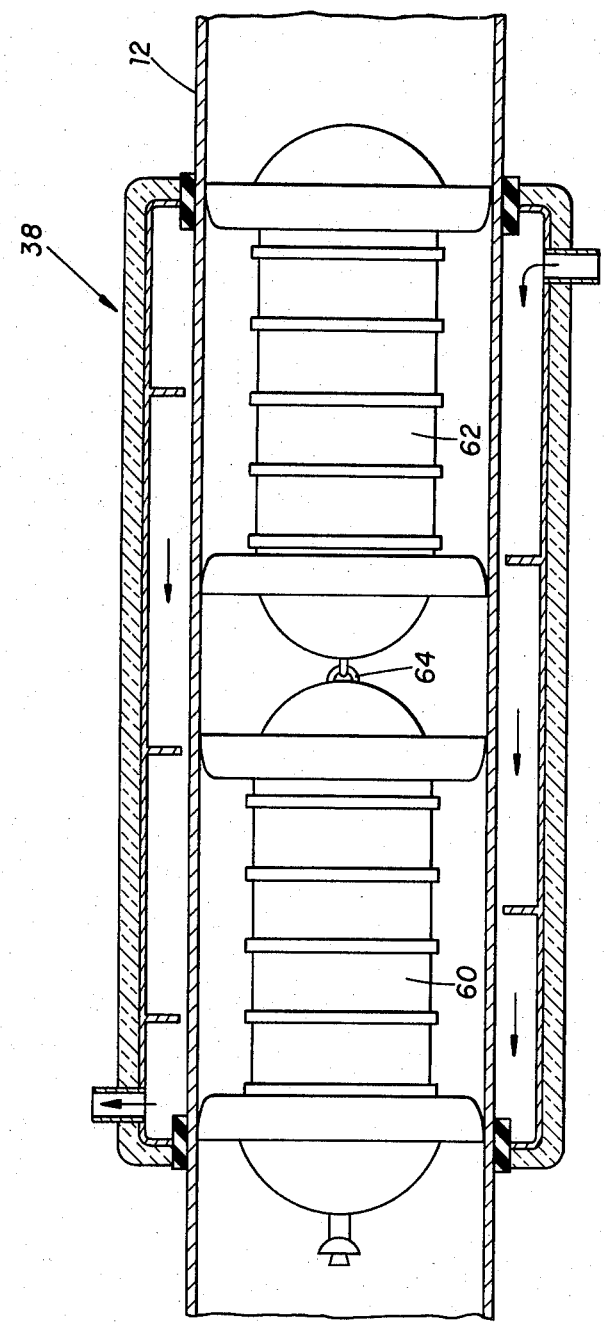
FIG. 2 is a cross-sectional side view of the second preferred embodiment of this invention.

FIG. 2 illustrates a second preferred embodiment of the present invention. Shown therein are two bodies 60 and 62, joined together via universal joint type of coupling 64. These bodies are able to pass through both vertical and horizontal curves more readily by being able to "bend" at the middle via coupling 64. Bodies 60 and 62 are structurally identical to body 10.

OPERATION

In the operation of the instant invention, a location along the fluid filled pipeline, generally midway between two predetermined points, is selected and the pipe uncovered so that tank 38 can be placed into position therearound. Concurrently, body 10 is being pumped down pipeline 12, its progress being followed via signals received from radio transmitter 30. As soon as body 10 reaches the aforementioned location and is in the position shown in FIG. 1 with respect to tank 38, downstream valves are closed and fluid flow stopped.

The formation of an ice plug in annular space 28 begins with the bolting together of sections 38a and 38b with $CO_2$ ice packed in chamber 44. Alcohol or acetone is then introduced to chamber 44 via inlet 48, reacting with the $CO_2$ ice to quickly produce temperatures in the range of minus 100° Fahrenheit. Freezing of the fluid in annular space 28 occurs rapidly because of its small volume; i.e., the size of body 10 is such as to occupy most of the volume of pipeline 12, and because circulation of warmer fluid elsewhere in pipeline 12 into annular space 28 is prevented by packer cups 22.

Also, insulating layers 20 block heat transfer via ends 16 and 18 of body 10.

After the ice plug is formed in annular space 28, pressure testing of pipeline 12 can begin. However, as the pressure increases, it tends to force body 10 out of the ice plug surrounding it. As is well known to those skilled in the art, freezing of the fluid in annular space 28 occurred transitionally and each transitional zone, from interior wall 24 inwardly toward shell 14, exhibits a warmer temperature. Thus, the zone of ice adjacent interior wall 24 is the coldest while the zone of ice adjacent shell 14 is warmest. This situation sets up a condition whereby any movement of body 10 induced by the aforementioned pressure will cause additional warming, via friction, along the contact of the ice plug and shell 14. Such warming can cause a molecular layer of fluid to form at the contact, said layer acting as a lubricant to induce more movement by body 10. Eventually body 10 would slip loose, destroying the ice plug. However, ribs 26, which project outwardly from shell 14 into colder zones of ice, are sufficient to lock body 10 into the ice plug.

During the pressure test, freezing temperatures are maintained by circulating a refrigerant, such as a chilled calcium chloride solution, through chamber 44 via inlet 48 and outlet 50.

Upon the completion of the test, the refrigerant in chamber 44 is flushed out, sections 38a and 38b are unbolted and removed from around the pipeline 12 and the excavation filled in. As complete thawing is not required, body 10 can be moved, via pump pressures, within a very short time.

The operation of the second preferred embodiment shown in FIG. 2 is exactly the same as described above.

One of the important features of the instant invention is that body 10 reduces the volume of fluid to be frozen; i.e., only the fluid in annular space 28 need be frozen. Another feature stemming from a small annular space is that should the fluid be water, its expansion will be enough to hold body 10 tighter in place yet not enough to damage either shell 14 or pipeline 12.

From the foregoing, it will be apparent to those experienced in pipeline testing that the instant invention provides an inexpensive and quick means for locating leaks. Since it is not necessary to repeatedly cut into a pipeline in order to find a leak, the integrity of the line is preserved.

It is also apparent that the use of the present invention can be accomplished by workmen unskilled in this art.

Although the invention has been described with reference to the embodiments illustrated, it will be appreciated by those skilled in the art that additions, modifications, substitutions, deletions and other changes not specifically described may be made which fall within the spirit of the invention which is not intended to be limited except as indicated in the appended claims.

What is claimed is:

1. An apparatus for use in freezing the fluid within a short section of a fluid-filled pipeline, which comprises:
   a. an elongated cylindrical body adapted to be positioned within said pipeline at said short section, said body having an annular, resilient disc at each end thereof, said discs contacting said pipeline forming a fluid-filled chamber between said pipeline and said body; and
   b. refrigerating means positioned at said short section around the exterior of said pipeline, said means operative to freeze the fluid in said fluid-filled chamber.

2. The apparatus of claim 1 wherein said cylindrical body is filled with insulating material.

3. The cylindrical body of claim 2 wherein said insulating material is urethane rigid foam.

4. The apparatus of claim 1 wherein said body includes concave ends.

5. The apparatus of claim 1 wherein said body includes transmitting means thereon.

6. An apparatus for freezing the fluid in a section of pipeline, which comprises:
   a. a plurality of cylindrical bodies each connected to another in tandem, said bodies adapted to be positioned in said section of said pipeline, said bodies including resilient annular discs positioned at each end of each of said bodies; and
   b. refrigerating means adapted to be positioned around said section of said pipeline, said refrigerating means operative to freeze said fluid trapped between said resilient discs.

7. A method of freezing fluid in a section of pipeline which comprises the steps of:
   a. positioning at least one cylindrical body having resilient annular outwardly projecting discs at each end thereof in said pipeline at said section thereof, said discs enclosing an annular space between said at least one body and said pipeline;
   b. positioning refrigerating means around said pipeline at said section thereof; and
   c. freezing fluid in said annular space by introducing refrigerants into said refrigerating means.

8. The method of claim 7 further characterized by the additional step of circulating chilled fluids through said refrigerating means to maintain freezing temperatures in said annular space.

9. The method of claim 8 wherein said chilled fluids is a calcium chloride solution.

10. The method of claim 7 wherein said refrigerants are $CO_2$ ice and alcohol.

11. The method of claim 7 wherein said refrigerants are $CO_2$ ice and acetone.

* * * * *